United States Patent
Hidaka

(10) Patent No.: US 6,654,491 B1
(45) Date of Patent: Nov. 25, 2003

(54) METHOD AND APPARATUS FOR PROCESSING AN IMAGE, AND RECORDING MEDIUM

(75) Inventor: Yumiko Hidaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/016,428

(22) Filed: Jan. 30, 1998

(30) Foreign Application Priority Data

Jan. 31, 1997 (JP) .............................................. 9-018770

(51) Int. Cl.⁷ ................................................ G06K 9/00
(52) U.S. Cl. ........................ 382/162; 382/274; 358/516; 358/518; 358/520
(58) Field of Search ................................ 382/162, 167, 382/274; 707/528; 345/150–155, 501, 418, 589–604; 358/504–505, 518–523, 500, 516, 1.9, 1.15; 717/528; 250/237 G; 356/326; 348/227.1, 603

(56) References Cited

U.S. PATENT DOCUMENTS

| | | | | |
|---|---|---|---|---|
| 4,992,963 A | * | 2/1991 | Funt et al. .................. | 382/162 |
| 5,432,906 A | * | 7/1995 | Newman et al. ............ | 345/501 |
| 5,502,580 A | * | 3/1996 | Yoda et al. .................. | 358/518 |
| 5,532,848 A | * | 7/1996 | Beretta ........................ | 358/504 |
| 5,634,092 A | * | 5/1997 | Stokes ........................ | 345/418 |
| 5,680,327 A | * | 10/1997 | Cook et al. .................. | 356/326 |
| 5,754,682 A | * | 5/1998 | Katoh ......................... | 382/162 |
| 5,806,081 A | * | 9/1998 | Swen et al. .................. | 717/528 |
| 5,884,014 A | * | 3/1999 | Huttenlocher et al. ...... | 358/1.15 |
| 6,043,909 A | * | 3/2000 | Holub ......................... | 358/504 |
| 6,078,732 A | | 6/2000 | Beretta ........................ | 358/1.9 |
| 6,081,254 A | * | 6/2000 | Tanaka et al. .............. | 382/167 |
| 6,118,455 A | * | 9/2000 | Hidaka et al. ............... | 345/589 |
| 6,229,140 B1 | | 5/2001 | Ishizuka .................. | 250/237 G |
| 6,344,900 B1 | | 2/2002 | Hidaka ........................ | 358/1.9 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

An image processing technique of achieving color matching in terms of image colors respectively observed at sending and receiving ends. A first image processing apparatus transmits image data to a second image processing apparatus which performs color adaptation conversion on the basis of output image illumination light source information and input image illumination light source information. The first image processing apparatus includes an input device which inputs input image illumination light source information and profile information of a source device, and a transfer device which transfers the input image illumination light source information, the profile information, and image data representing an input image in a form depending on the source device, to the second image processing apparatus. The second image processing apparatus performs color adaptation conversion through a communication line.

11 Claims, 8 Drawing Sheets

METHOD AND APPARATUS FOR PROCESSING AN IMAGE, AND RECORDING MEDIUM

BACKGROUND OF THE INVENTION

1. Field of the Invention

The present invention relates to a method and apparatus for transmitting image data through a communication system or network.

2. Description of the Related Art

With recent advancements in color image processing technology, it has become popular to deal with a color image not only in special fields such as Computer Graphics CG design, but also in a wide variety of normal work performed in general offices. Furthermore, with advancements in communication and network technology, it has also become popular to share information through a communication system or network.

In order that an image produced at a sending end can be shared with a receiving end through a communication system or a network, it is required that the image be perceived as equal in colors at both ends.

For example, when a picture designed by a designer is sent from a sending end through communication means, and the same picture is observed at both sending and receiving ends, if there is a difference in color between the images seen at the sending and receiving ends, misinterpretation of the picture or other problems can occur.

When an image is shared by a person who produced the image and other persons who observe the image received through the Internet which has become very popular in recent years, if there is a difference between the environment or the tool employed by the person who produced the image and that employed by the persons at the receiving end, a similar problem can occur.

Such a difference in colors occurs because no information about the light source under which the image is produced and about the tool used to produce the image is not transmitted together with the image, and thus the image is processed at the receiving end on the assumption that a standard light source and a tool having standard characteristics are used at the sending end. That is, if a light source or a tool which is different from the standard light source or the standard tool is used, a difference in colors can occur between the image seen at a sending end and that seen at a receiving end.

In one known technique to solve the above problem, as shown in FIG. 8, the light source used at the sending end is guessed using a light source color guessing unit provided at either the sending or receiving end, and an image is output on an image outputting device after illumination light conversion is performed on the basis of the information about the guessed light source.

In the technique shown in FIG. 8, although it is possible to obtain information about the light source employed at the sending end, guessed by the light source guessing unit, it is still impossible to perfectly eliminate a difference arising from the difference in environmental condition because of the lack of information about the tool used to input an image and the light source and the tool used at the receiving end. In many cases, therefore, the image does not look exactly the same at both the sending and receiving ends.

If there is a difference between the light source used in the receiving-end environment in which an image is observed and that used in the sending end, the color looks different between the sending end and the receiving end because the human perception of colors depends on the light source used. Therefore, color adaptation correction is necessary. For the above reason, the process based on only information about the light source obtained by the guessing using the light source color guessing unit cannot provide an exact correction in terms of the difference in color perception due to the estimation error of the light source. Furthermore, it is impossible to correct the change in color due to the change in environmental conditions at the receiving end, and thus the colors of the image are perceived differently between the sending and receiving ends.

SUMMARY OF THE INVENTION

In view of the above problem, it is an object of the present invention to provide a simple technique of achieving better matching in terms of image colors between sending and receiving ends.

To achieve the above object, the invention provides a method and apparatus in any of aspects described below.

According to a first aspect of the invention, there is provided an image processing apparatus for transmitting image data to a second image processing apparatus having the capability of performing color adaptation conversion on the basis of output image illumination light source information and input image illumination light source information, the apparatus comprising: input means for inputting input image illumination light source information and profile information of a source device; and transferring means for transferring the input image illumination light source information, the profile information, and image data representing an input image in a form depending on the source device to the second image processing apparatus having the capability of performing color adaptation conversion through a communication line.

According to a second aspect of the present invention, there is provided an image processing apparatus comprising: inputting means for inputting input image data, profile data of a source device, and input image illumination light source information from an external apparatus through a communication line; color adaptation conversion means for performing color adaptation conversion according to output image illumination light source information and the input image illumination light source information; color matching processing means for performing a color matching process according to the profile data of the source device and profile data of an output device; and outputting means for outputting, to the output device, image data which has been subjected to the color adaptation conversion and the color matching process.

According to a third aspect of the invention, there is provided an image processing apparatus comprising: receiving means for receiving output image illumination light source information from a receiving apparatus through a communication line; inputting means for inputting input image illumination light source information; color adaptation conversion means for performing color adaptation conversion on an input image according to the input image illumination light source information and the output image illumination light source information; transmitting means for transmitting image data, which has been subjected to the color adaptation conversion, to the receiving apparatus through the communication line.

Other objects of the present invention and the features thereof will become fully apparent from the following

DESCRIPTION OF THE PREFERRED EMBODIMENTS

Figure 1:
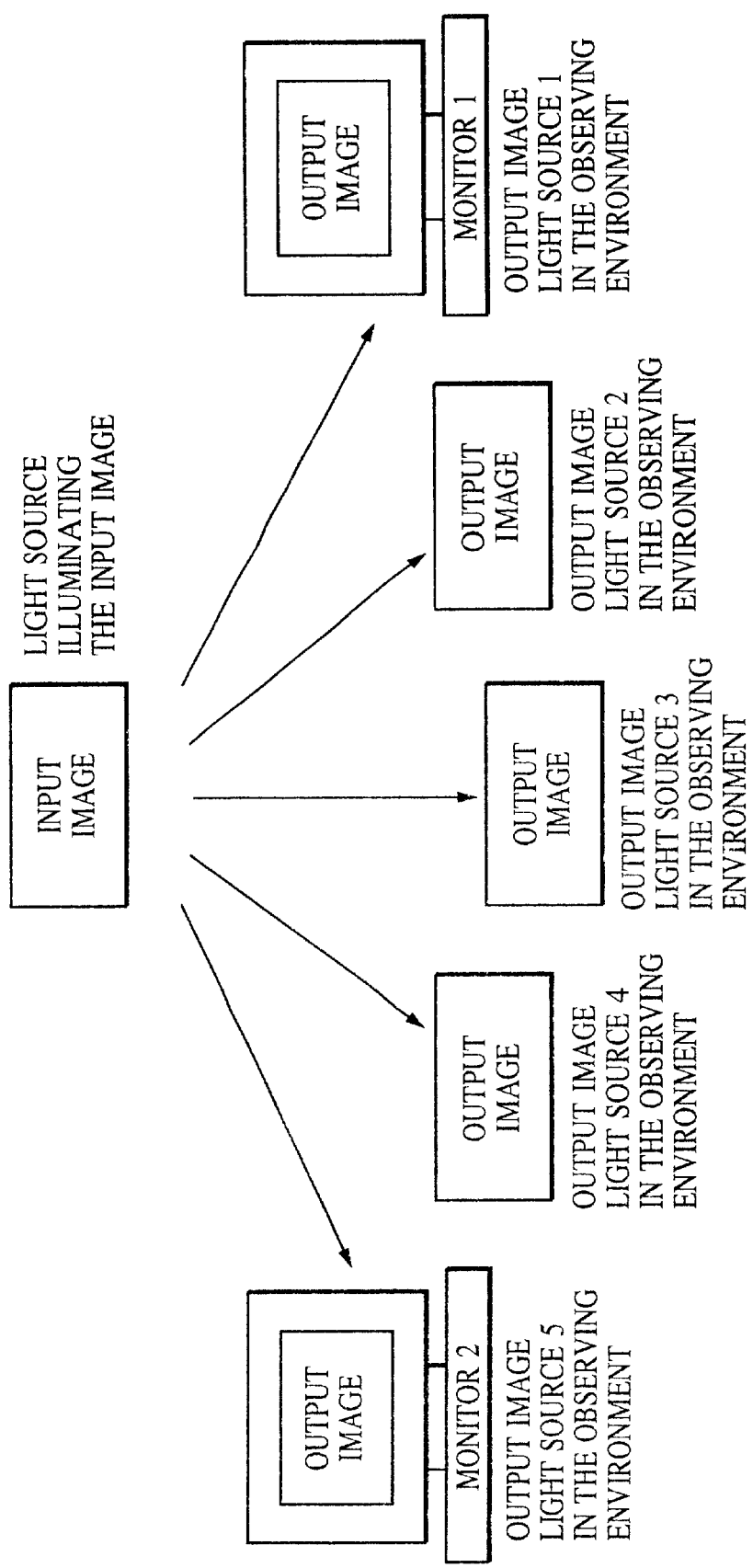
FIG. 1 is a schematic diagram illustrating the construction of a system according to an embodiment of the invention.

The invention is now described in further detail below, by way of example, with reference to specific embodiments in which an image is shared by users at different locations through the Internet which has become popular in recent years. That is, there are shown some examples in which the invention is applied to a system in which an input image is transmitted to different locations through a communication system or a network so that a great number of users can observe the image in various environments (different light sources used to observe the image) using different tools, as shown in FIG. 1.

EMBODIMENT 1

A first embodiment described below deals with a system in which an image of a printed matter is input and the image is output on a monitor.

Figure 2:
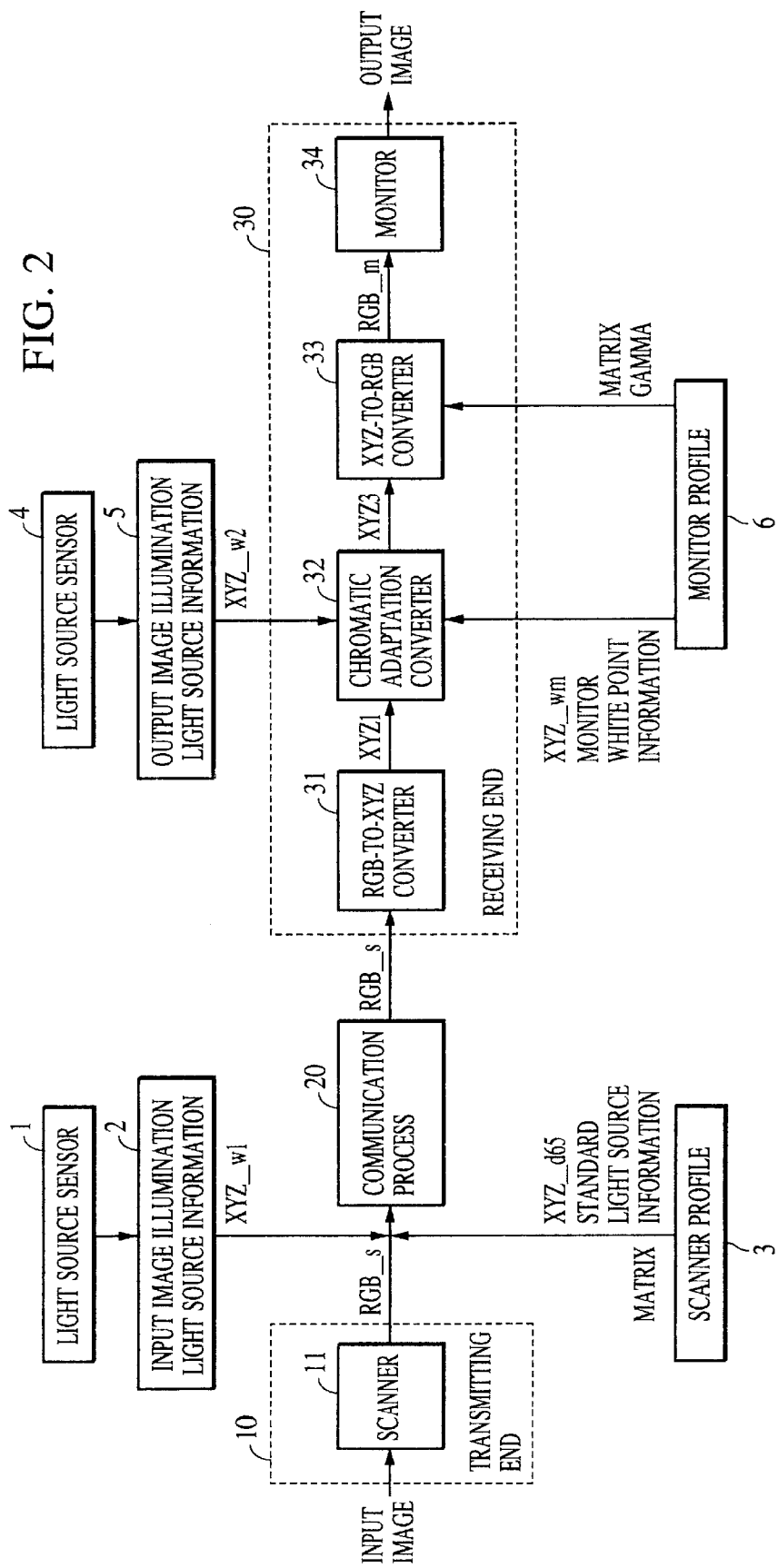
FIG. 2 illustrates the flow of the process in a mode (1-1) of the first embodiment of the invention.

FIG. 2 illustrates an example of a system according to the first embodiment of the invention.

The system comprises: light source sensors 1 and 4 for obtaining information about light sources used to observe input and output images, respectively; a scanner 11 for scanning an image and generating image data corresponding to the scanned image; a scanner profile 3 including the information about the scanner characteristics; an RGB-to-XYZ converter 31 for converting the scanner characteristics; a monitor 34 for displaying an image; a monitor profile 6 including the information about the monitor characteristics; an XYZ-to-RGB converter 33 for converting the monitor characteristics; and a color adaptation converter 32 for performing color adaptation conversion based on the information about the input and output devices and the light sources. Of various processes required in the system to share the image, some are performed at the sending end and others are performed at the receiving end, and various kinds of information are transmitted between the sending and receiving ends through the communication means or network.

The data shared by sending and receiving ends may be processed in four different manners as described in detail below.

Any of these four techniques may be selected to transmit an image depending on the particular protocol employed in the system.

By properly selecting a technique most suitable for the system depending on the particular protocol, it is possible to optimize the system so that it can work in a convenient fashion for users.

[1-1] Only the scanner for scanning an image is provided at the sending end, and all processes are performed at the receiving end on the basis of the RGB data received from the sending end.

Referring to FIG. 2, the flow of the process performed in the system of the type [1-1] is described below.

At the sending end 10, a printed matter is scanned by the scanner 11 and an input image in the form of RGB image data is obtained. The RGB image data depends on the characteristics of the particular scanner used.

The device-dependent RGB image data is transmitted to the receiving end 30 through a communication system or a network 20. Together with the RGB image data, input image illumination light source information ($X_{w1}$ $Y_{w1}$ $Z_{w1}$) (denoted by reference numeral 2 in FIG. 2) representing the information about the light source used to observe the input image is also transmitted. More specifically, the input image illumination light source information ($X_{w1}$ $Y_{w1}$ $Z_{w1}$) represents the chromaticity of the light source used in the environment where the input image is observed, and this information is obtained through the sensor 1 provided on the input device.

The input image illumination light source information 2 may also be obtained through a manually inputting operation by a human operator.

The scanner profile 3 including the information about the color characteristics of the scanner used at the sending end 10 is also transmitted together with the above information. The scanner profile 3 includes the information about the RGB signal output by the scanner, the XYZ value obtained by measuring the colors of the original image corresponding to the output signal of the scanner, the matrix used to determine the scanner profile, and the white point information ($X_{d65}$ $Y_{d65}$ $Z_{d65}$) of the standard light source D65. Herein the XYZ value is determined for the standard light source D65. The data included in the scanner profile representing the color characteristics of the scanner is not limited to the form of a matrix, but may be represented in the form of an LUT.

The receiving part 30 produces an image from the received RGB image data according to the data 2 ($X_{w1}$ $Y_{w1}$ $Z_{w1}$) of the light source associated with the input image, the scanner profile 3, the data ($X_{w2}$ $Y_{w2}$ $Z_{w2}$) of the light source associated with the output image obtained at the receiving end 10, and the monitor profile, in such a manner optimum for the output tool and other environmental conditions at the receiving end 30.

At the receiving part 30, the RGB-to-XYZ converter 31 converts the received RGB image data to XYZ($X_1$ $Y_1$ $Z_1$) data corresponding to the standard light source using the matrix data described in the scanner profile. Then, the color adaptation converter 32 performs color adaptation conversion using the Von Kreis' formula (equation (1)) so as to compensate for the difference in the perceived colors depending on the observation environment.

$$\begin{pmatrix} X_2 \\ Y_2 \\ Z_2 \end{pmatrix} = (M)^{-1}(D)(M) \begin{pmatrix} X_1 \\ Y_1 \\ Z_1 \end{pmatrix}$$

where $$(D) = \begin{pmatrix} L_{w2}/L_{w1} & 0 & 0 \\ 0 & M_{w2}/M_{w1} & 0 \\ 0 & 0 & S_{w2}/S_{w1} \end{pmatrix}$$

$$(M) = \begin{pmatrix} 0.071 & 0.945 & -0.016 \\ -0.461 & 1.360 & 0.101 \\ 0 & 0 & 1.0 \end{pmatrix}$$

$$\begin{pmatrix} L_{w1} \\ M_{w1} \\ S_{w1} \end{pmatrix} = (M) \begin{pmatrix} X_{w1} \\ Y_{w1} \\ Z_{w1} \end{pmatrix}, \begin{pmatrix} L_{w2} \\ M_{w2} \\ S_{w2} \end{pmatrix} = (M) \begin{pmatrix} X_{w2} \\ Y_{w2} \\ Z_{w2} \end{pmatrix}$$

In the above formula, $L_{w1}$, $M_{w1}$ and $S_{w1}$ are the amount of response of cone cells of a human eye for tristimulus values $X_{w1}$, $Y_{w1}$, and $Z_{w1}$ of light under test, and $L_{w2}$, $M_{w2}$, and $S_{w2}$ are the amount of response of cone cells for tristimulus values $X_{w2}$, $Y_{w2}$, $Z_{w2}$ of reference light.

If the white point data ($X_{d65}$ $Y_{d65}$ $Z_{d65}$) of the standard light source is substituted as the tristimulus values of light under test into the Von Kreis' formula and the received data ($X_{w1}$ $Y_{w1}$ $Z_{w1}$) of the input image illumination light source is substituted as the tristimulus values of the standard light source, then the image data is converted into a form adapted to the input image illumination light source.

The image data is further converted into a form adapted to the output image observation environment using the input image illumination light source information ($X_{w1}$ $Y_{w1}$ $Z_{w1}$) associated with the light source used to observe the input image and the output image illumination light source information ($X_{w2}$ $Y_{w2}$ $Z_{w2}$) associated with the light source used to observe the output image according to the Von Kreis' formula.

In this specific example, the input image is a printed matter (object color), and the output image is displayed on a monitor (light source color), and therefore there is a difference in color mode. Thus, it is also required to perform environment light conversion so as to compensate for the difference in color mode.

When a human being sees an image on a monitor, he/she cannot perceive a white color displayed on the monitor as intended but perceives it as a color between the white color displayed on the monitor and a white color in the environment where the monitor is located. To compensate for the above difference in the perceived white color, an adapted white point ($X_{w3}$ $Y_{w3}$ $Z_{w3}$) is calculated using the output image observation environment information (white data ($X_{w2}$ $Y_{w2}$ $Z_{w2}$) of the light source) obtained though the sensor located near the monitor and also using the white point data ($X_{wm}$ $Y_{wm}$ $Z_{wm}$) of the monitor, according to the following equation (2).

$$X_{w3} = a \times X_m + (1-a) \times X_{w2}$$
$$Y_{w3} = a \times Y_m + (1-a) \times Y_{w2}$$
$$Z_{w3} = a \times Z_m + (1-a) \times Z_{w2} \qquad (2)$$

where an is the adaptation ratio having a value depending on the particular light source, $X_m$, $Y_m$, and $Z_m$ represent white information of the monitor, and $X_{w2}$, $Y_{w2}$, and $Z_{w2}$ represent the information about the white color of the light source used to observe the output image.

The image data to be displayed on the monitor is converted to image data ($X_3$ $Y_3$ $Z_3$) adapted to the light source in the environment where the output image is observed, by substituting the white data ($X_{w1}$ $Y_{w1}$ $Z_{w1}$) of the light source used in the environment where the input image is observed into the Von Kreis' formula as tristimulus values of light under test, and substituting the adapted white point ($X_{w3}$ $Y_{w3}$ $Z_{w3}$) of the monitor obtained by the above method into the formula as the tristimulus values of the reference light.

Although the conversion is performed according to the Von Kreis' formula in this specific embodiment, another color adaptation formula may also be employed.

Figure 3:
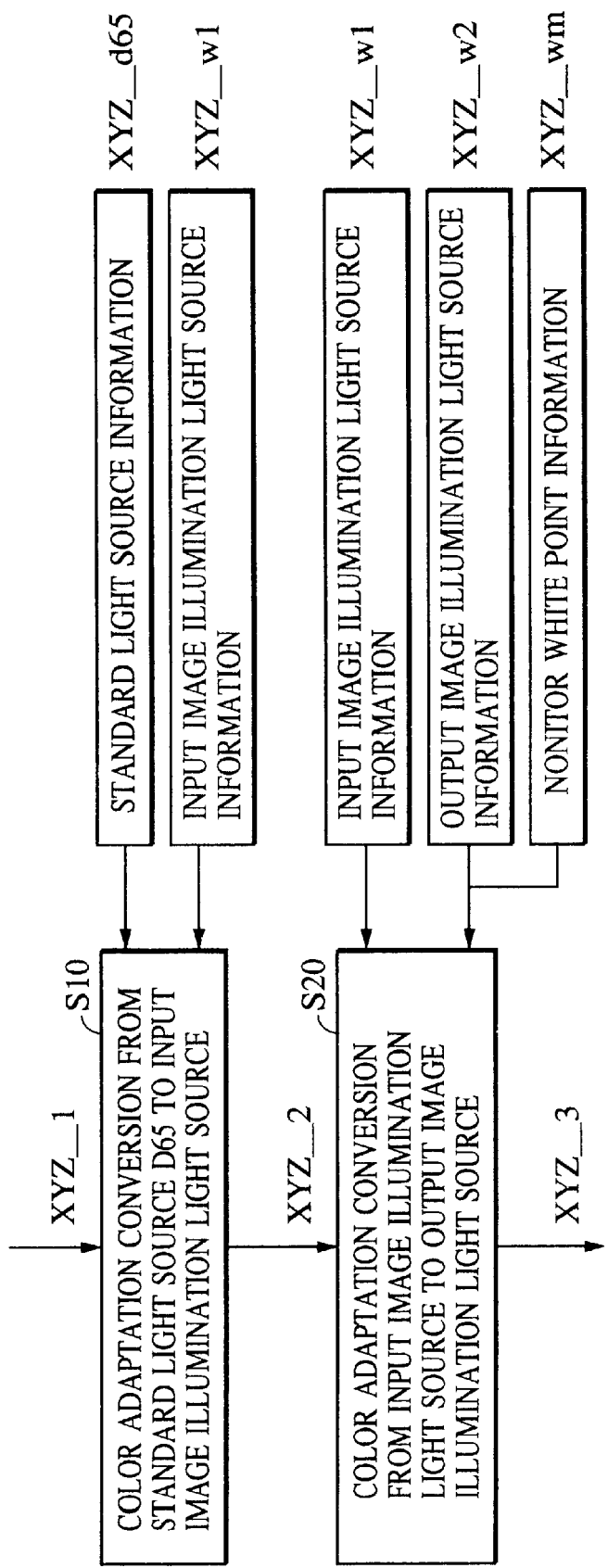
FIG. 3 illustrates the flow of color adaptation conversion process according to the first embodiment of the invention.

FIG. 3 illustrates the flow of the color adaptation conversion process. In step S10, color adaptation conversion from the standard light source to the input image illumination light source is performed using the data ($X_{d65}$ $Y_{d65}$ $Z_{d65}$) of the standard light source and the data ($X_{w1}$ $Y_{w1}$ $Z_{w1}$) of the input image illumination light source. Then in step S20, color adaptation conversion from the input image illumination light source to the output image illumination light source is performed using the data ($X_{w1}$ $Y_{w1}$ $Z_{w1}$) of the input image illumination light source and the data ($X_{w2}$ $Y_{w2}$ $Z_{w2}$) of the output image illumination light source. In the case where the output image is displayed on the monitor, the manner in which the color adaptation is performed in a different manner from that for an image printed on paper. That is, the data ($X_{w3}$ $Y_{w3}$ $Z_{w3}$) of the adapted white point of the monitor is calculated according to equation (2) using the data ($X_{wm}$ $Y_{wm}$ $Z_{wm}$) of the white point of the monitor and the data ($X_{w2}$ $Y_{w2}$ $Z_{w2}$) of the output image illumination light source.

The image data $X_3$ $Y_3$ $Z_3$ obtained by the color adaptation conversion performed by the color adaptation converter 32 is further converted to image data $R_m$ $G_m$ $B_m$ according to the matrix data and gamma data included in the monitor profile 6 so as to adapt the output image data to the characteristics of the monitor.

The monitor profile represents, in the form of the matrix, the relationship between the output signal RGB displayed on the monitor and the color value XYZ to be displayed on the monitor. The matrix data is determined from the characteristics of the phosphors on the particular monitor and the white point information.

If an image is displayed on the basis of the data $R_m$ $G_m$ $B_m$ obtained in the above-described manner, then the color of the image perceived at the receiving end becomes equal to that perceived at the sending end regardless of the difference between the light source in the input image environment and that in the output image environment and regardless of the difference in color mode.

In conclusion, the data transmitted from the sending end to the receiving end includes RGB image data that is not converted in terms of the scanner characteristics, the data ($X_{w1}$ $Y_{w1}$ $Z_{w1}$) of the input image illumination light source, and the scanner profile including the conversion matrix data and the white data ($X_{d65}$ $Y_{d65}$ $Z_{d65}$) of the standard light source.

[1-2] In this mode, the scanner serving as the input device and the RGB-to-XYZ converter for converting the scanner characteristic are placed at the sending end, while the color adaptation converter and the monitor characteristic converter for compensating for the difference in the characteristic of the outputting device are placed at the receiving end.

Figure 4:
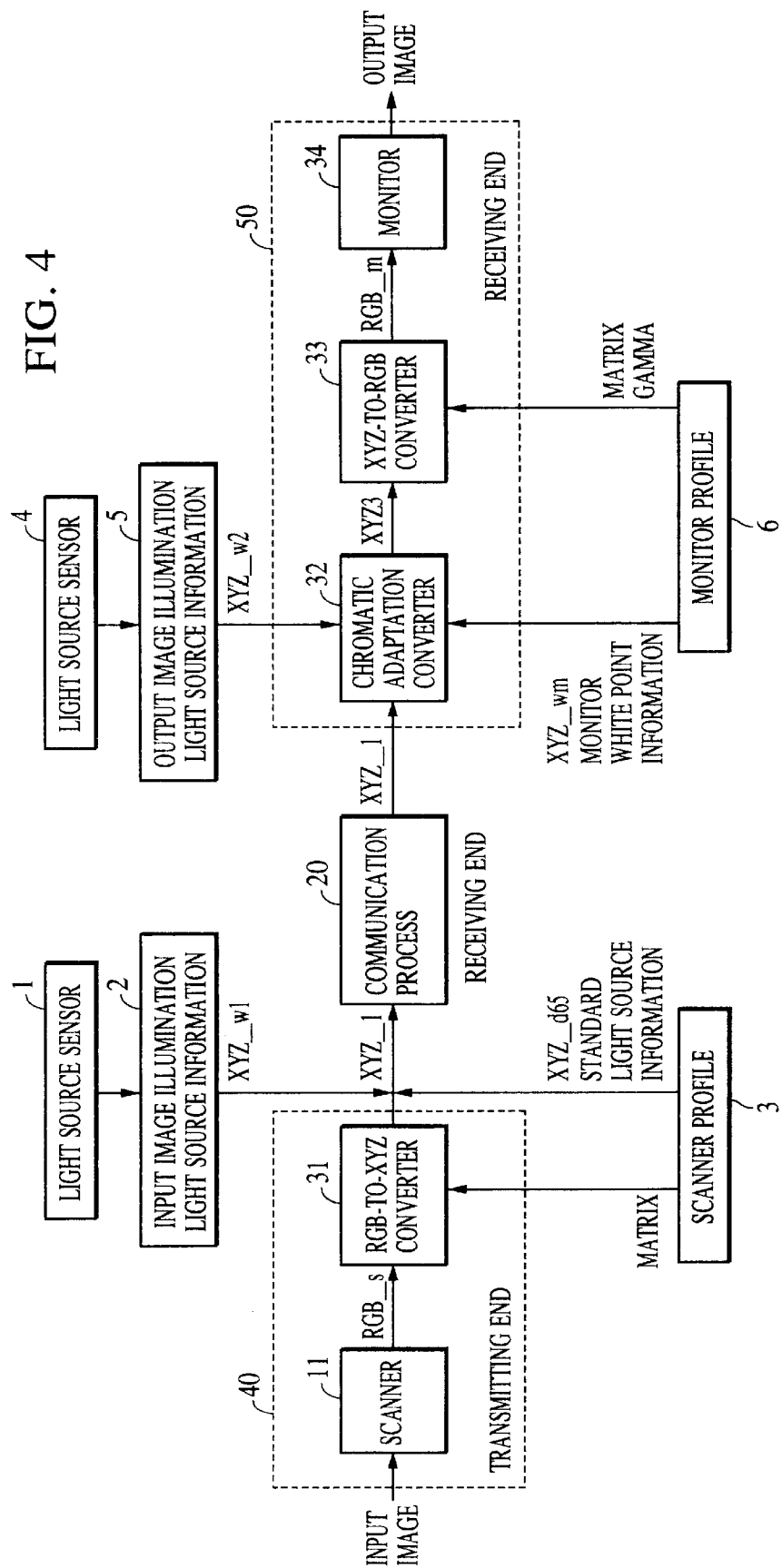
FIG. 4 illustrates the flow of a process in a mode (1-2) of the first embodiment of the invention.

Referring to FIG. 4, the flow of the process in the mode [1-2] is described below. The similar parts of those used in the system in the mode [1-1] are denoted by similar reference numerals, and they are not described in further detail below.

At the sending end 40, an input image is scanned by the scanner 11 and a scanner RGB image data is produced. The obtained scanner RGB data is converted to XYZ data based on the standard light source D65 using the matrix data described in the scanner profile 3.

The XYZ image data $(X_1\ Y_1\ Z_1)$ based on the standard light source, the white data $(X_{d65}\ Y_{d65}\ Z_{d65})$ of the standard light source, and the white data $(X_{w1}\ Y_{w1}\ Z_{w1})$ of the light source used to observe the input image are transmitted to the receiving end through the communication system 20.

At the receiving end 50, the color adaptation converter 32 performs color adaptation conversion on the received XYZ data based on the standard light source. First, the white data $(X_{d65}\ Y_{d65}\ Z_{d65})$ of the standard light source is substituted as the tristimulus values of the light under test into the Von Kreis' formula (equation (1)), and the data $(X_{w1}\ Y_{w1}\ Z_{w1})$ of the input image illumination light source is substituted into the formula as the tristimulus values of the reference light so as to obtain image data corresponding to the input image illumination light source.

To obtain image data corresponding to the output image illumination light source, the white data of the input image illumination light source is substituted as the tristimulus values of the light under test into equation (1), and furthermore, the white point adapted to the monitor calculated from the output image illumination light source and the white point data of the monitor using equation (2) is substituted into equation (1) as the tristimulus values of the reference light thereby performing color adaptation conversion as well as mode conversion.

The obtained XYZ image data is then converted to RGB data according to the data described in the monitor profile, and the resultant output signal is displayed on the monitor.

[1-3] In this mode, the scanner serving as the input device, the RGB-to-XYZ converter for converting the scanner characteristic, and the color adaptation converter are placed at the sending end, while the monitor characteristic converter for compensating for the difference in the characteristic of the outputting device is placed at the receiving end.

Figure 5:
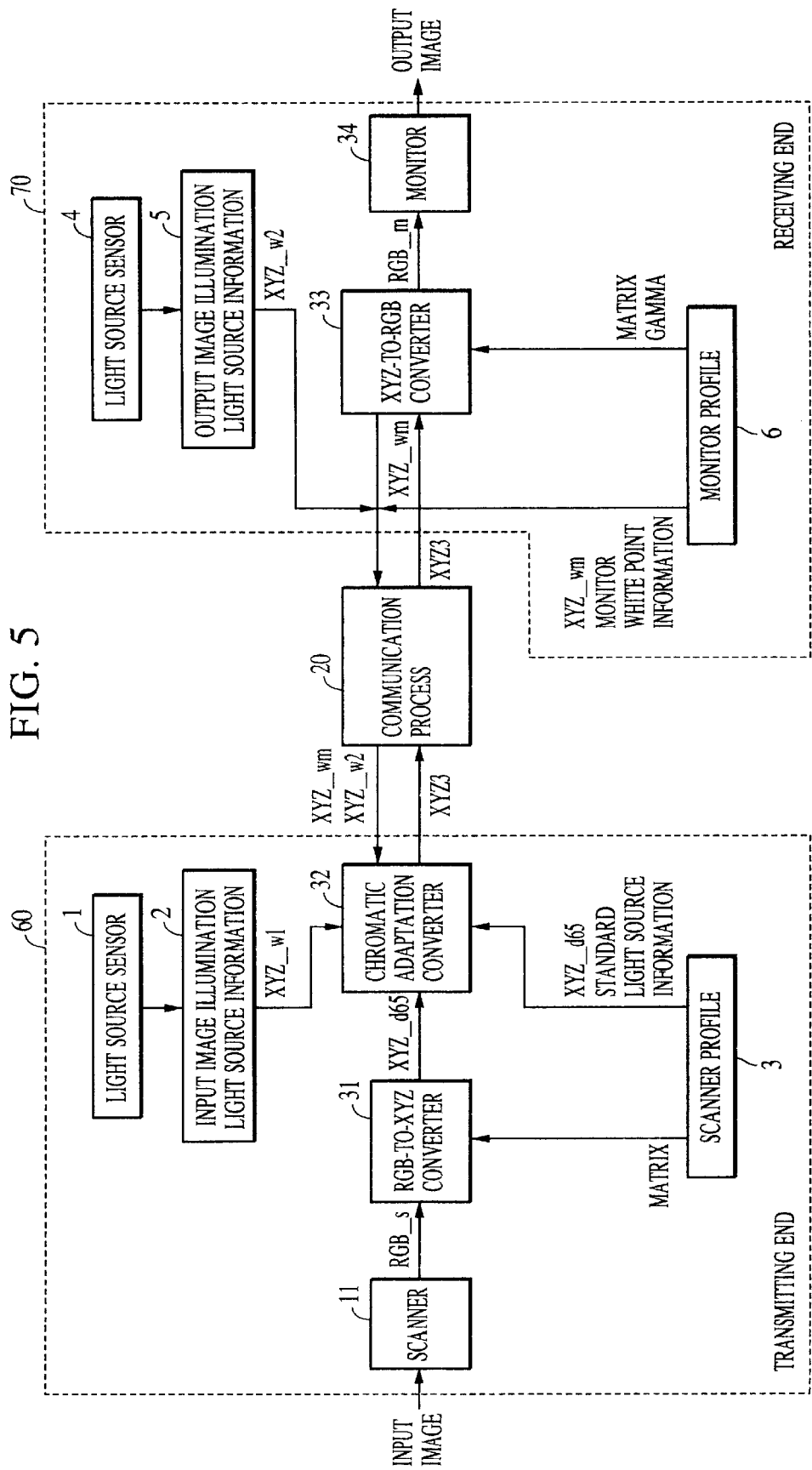
FIG. 5 illustrates the flow of a process in a mode (1-3) of the first embodiment of the invention.

Referring to FIG. 5, the flow of the process in the mode [1-3] is described below. The similar parts of those used in the system in the mode [1-1] are denoted by similar reference numerals, and they are not described in further detail below.

At the sending end 80, an input image is scanned by the scanner 11 and a scanner RGB image data is produced. The obtained scanner RGB data is converted to XYZ data $(X_1\ Y_1\ Z_1)$ based on the standard light source D65 using the matrix data described in the scanner profile.

The color adaptation converter 32 performs color adaptation conversion on the received XYZ data based on the standard light source. First, the white data $(X_{d65}\ Y_{d65}\ Z_{d65})$ of the standard light source is substituted as the tristimulus values of the light under test into the Von Kreis' formula (equation (1)), and the data $(X_{w1}\ Y_{w1}\ Z_{w1})$ of the input image illumination light source is substituted into the formula as the tristimulus values of the reference light so as to obtain image data corresponding to the input image illumination light source.

To obtain image data corresponding to the output image illumination light source, the data $(X_{w1}\ Y_{w1}\ Z_{w1})$ of the input image illumination light source is substituted as the tristimulus values of the light under test into equation (1), and furthermore, the white point $(X_{w3}\ Y_{w3}\ Z_{w3})$ adapted to the monitor calculated, using equation (2), from the data $(X_{w2}\ Y_{w2}\ Z_{w2})$ of the output image illumination light source and the white point data $(X_{wm}\ Y_{wm}\ Z_{wm})$ of the monitor is substituted into equation (1) as the tristimulus values of the reference light thereby performing color adaptation conversion as well as mode conversion. To perform the above process, the sending part acquires the data $(X_{w2}\ Y_{w2}\ Z_{w2})$ of the output image illumination light source and the white point data $(X_{wm}\ Y_{wm}\ Z_{wm})$ of the monitor by receiving these data from the receiving end 70.

After the color adaptation conversion described above, the resultant XYZ data is transmitted to the receiving end through the communication system.

The obtained XYZ image data is then converted to RGB data according to the data described in the monitor profile, and the resultant output signal is displayed on the monitor.

[1-4] In this mode, the scanner serving as the input device, the RGB-to-XYZ converter for converting the scanner characteristic, the color adaptation converter and the monitor characteristic converter for compensating for the difference in the characteristic of the outputting device are all placed at the sending end, and all processes are performed at the sending end. The resultant data is transmitted from the sending end to the receiving end.

Figure 6:
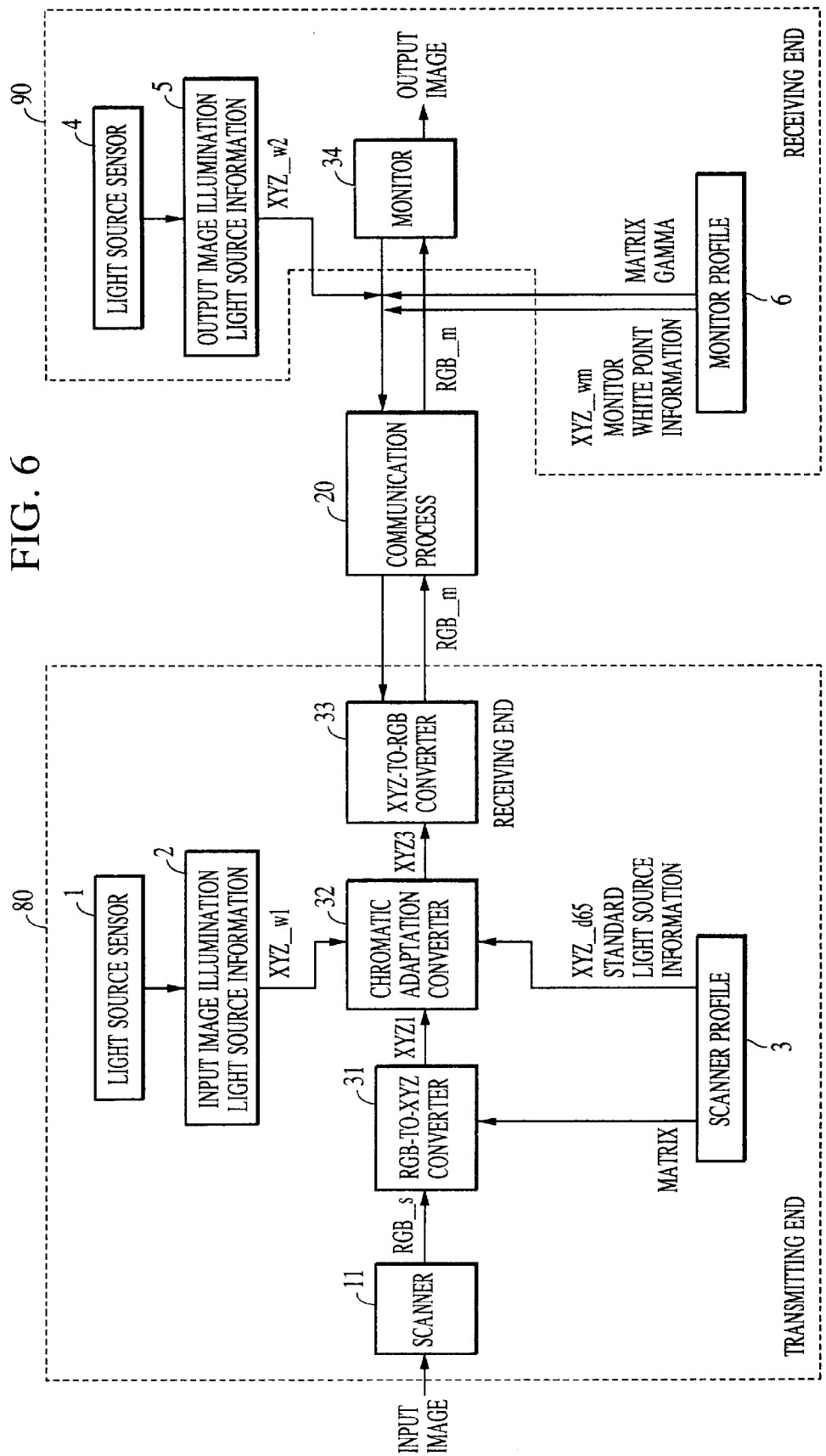
FIG. 6 illustrates the flow of a process in a mode (1-4) of the first embodiment of the invention.

Referring to FIG. 6, the flow of the process in the mode [1-4] is described below. The similar parts of those used in the system in the mode [1-4] are denoted by similar reference numerals, and they are not described in further detail below.

At the sending end 80, an input image is scanned by the scanner and a scanner RGB image data is produced. The obtained scanner RGB data is converted to XYZ data based on the standard light source D65 using the data described in the scanner profile.

The color adaptation converter 32 performs color adaptation conversion on the received XYZ data based on the standard light source. First, the white data $(X_{d65}\ Y_{d65}\ Z_{d65})$ of the standard light source is substituted as the tristimulus values of the light under test into the Von Kreis' formula (equation (1)), and the data $(X_{w1}\ Y_{w1}\ Z_{w1})$ of the input image illumination light source is substituted into the formula as the tristimulus values of the reference light so as to obtain image data corresponding to the input image illumination light source.

To obtain image data corresponding to the output image illumination light source, the data $(X_{w1}\ Y_{w1}\ Z_{w1})$ of the input image illumination light source is substituted as the tristimulus values of the light under test into equation (1), and furthermore, the white point $(X_{w3}\ Y_{w3}\ Z_{w3})$ adapted to the monitor calculated, using equation (2), from the data $(X_{w2}\ Y_{w2}\ Z_{w2})$ of the output image illumination light source and the white point data $(X_{wm}\ Y_{wm}\ Z_{wm})$ of the monitor is substituted into equation (1) as the tristimulus values of the reference light thereby performing color adaptation conversion as well as mode conversion. To perform the above process, the sending part acquires the data $(X_{w2}\ Y_{w2}\ Z_{w2})$ of the output image illumination light source and the white point data $(X_{wm}\ Y_{wm}\ Z_{wm})$ of the monitor by receiving these data from the receiving end 90.

The obtained XYZ image data is then converted to RGB data according to the data described in the monitor profile, and the resultant output signal is displayed on the monitor. To perform this process, the sending part acquires the monitor profile from the receiving end 90.

In the above process, all data may be acquired from the receiving end 80 at the beginning of the process instead of receiving the data step by step.

The obtained RGB data is transmitted to the receiving end 90, and displayed on the monitor at the receiving end.

EMBODIMENT 2

In the system according to the second embodiment described below, input and output images are displayed on monitors at respective ends.

Also in this embodiment, image conversion is performed to deal with the fact that when a human being sees an image on a monitor, he/she cannot perceive a white color displayed on the monitor as intended but perceives it as an intermediate color between the white color displayed on the monitor and a white color in the environment in which the monitor is located.

Figure 7:
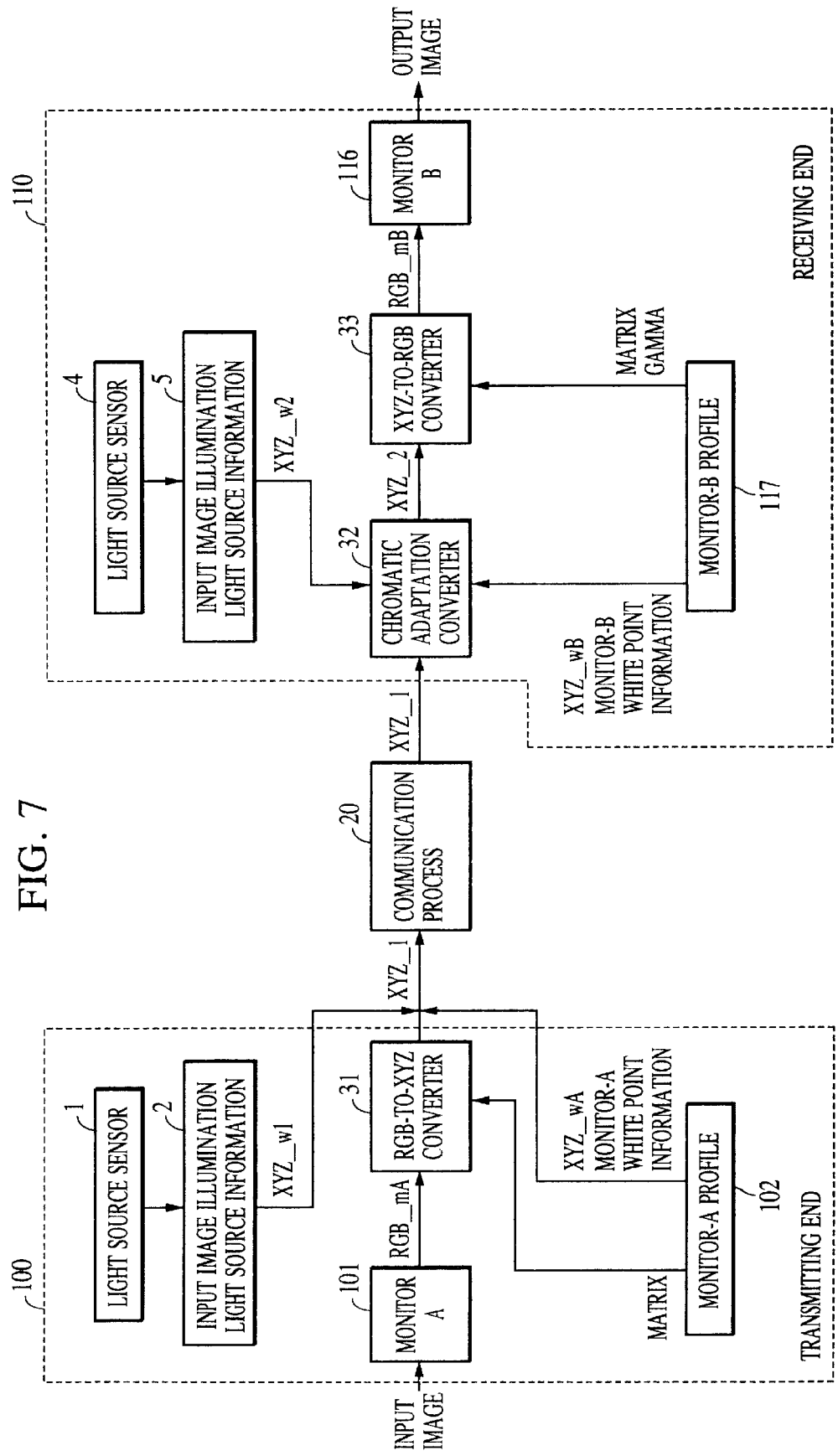
FIG. 7 illustrates the flow of a process according to a second embodiment of the invention.
Figure 8:
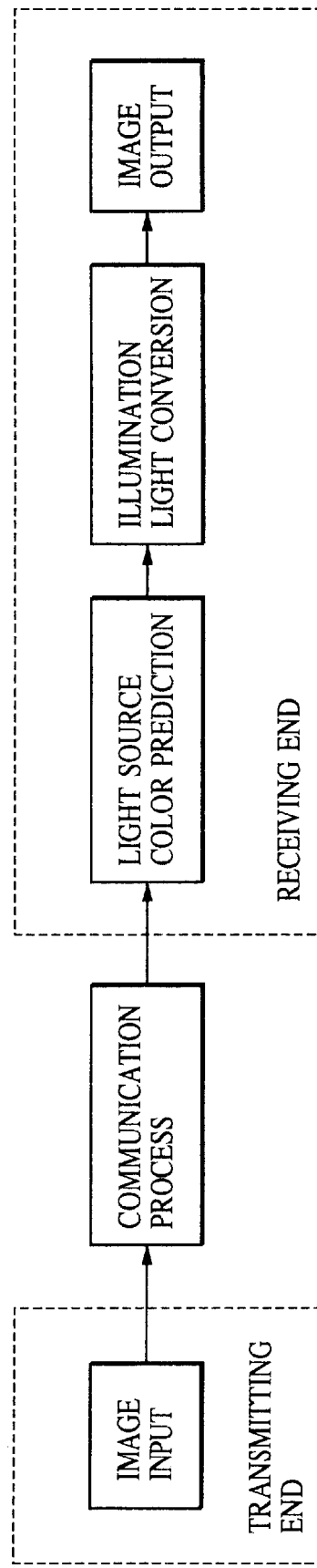
FIG. 8 illustrates the flow of a process according to a conventional technique.

At a sending end 100, as shown in FIG. 7, there are provided an RGB-to-XYZ converter 31 and a sensor 1 for obtaining data of an input image illumination light source. At a receiving end 110, on the other hand, there are provided a color adaptation converter 32, an XYZ-to-RGB converter 33, and a sensor 4 for obtaining data of an output image illumination light source. In this embodiment, thus, RGB data depending on the characteristic of the particular device employed is converted to device-independent XYZ data using matrix data stored in a monitor profile, and the resultant XYZ data is transmitted to the receiving end.

In this second embodiment, the system may be constructed in various manners as in the first embodiment, and the data transmitted from the sending end to the receiving end varies depending on the construction of the system, although the details are not described herein.

The RGB data of the image displayed on the monitor A is converted to XYZ data $(X_1\ Y_1\ Z_1)$ using matrix data produced from the data representing the chromaticity of phosphors and the white point of the monitor A described in the profile 102 of the monitor A thereby obtaining XYZ data corrected in terms of the device characteristics.

The obtained resultant XYZ data $(X_1\ Y_1\ Z_1)$ is transmitted to the receiving end 110 through the communication system 20.

The above steps of the process are performed in the same manner as in the first embodiment. At the next step in the second embodiment, the obtained XYZ data, the white point data $(X_{wA}\ Y_{wA}\ Z_{wA})$ of the monitor A, and the data $(X_{w1}\ Y_{w1}\ Z_{w1})$ of the input image illumination light source are transmitted to the receiving end 110. The data of the illumination light source refers to the color temperature and chromaticity $(X_{w1}\ Y_{w1}\ Z_{w1})$ of the light source actually used, or expected to be used, to observe the input image. This data is obtained through the sensor provided on the input device, or input by a user.

The second embodiment 2 is characterized in that the system has a color adaptation converter for performing color adaptation conversion using the white point data $(X_{wA}\ Y_{wA}\ Z_{wA})$ of the monitor A received from the sending end, the white point data $(X_{wB}\ Y_{wB}\ Z_{wB})$ of the monitor B stored in the profile of the monitor B, the data $(X_{w1}\ Y_{w1}\ Z_{w1})$ of the input image illumination light source received from the sending end, and the data $(X_{w2}\ Y_{w2}\ Z_{w2})$ of the output image illumination light source sensed by a sensor provided at the receiving end.

As described above, human beings cannot perceive the white color displayed on monitors as intended, but perceive it as an intermediate color between the white color of the monitor and the white color of the light source in the environment where the monitor is located. To adapt the color to the perception characteristic of human beings, color adaptation conversion is performed as follows. First, the adapted white point of the monitor A provided at the sending end is calculated using equation (2). Then, the adapted white point of the monitor B provided at the receiving end is calculated also using equation (2).

The adapted white point of the monitor A and that of the monitor B are substituted into the Von Kreis' formula represented in equation (2).

The XYZ data $(X_2\ Y_2\ Z_2)$ obtained by the above process is then converted to RGB data adapted to the monitor B according to the data described in the profile of the monitor B located at the receiving end.

In the case where the sending part has the color adaptation converter 20 in addition to the RGB-to-XYZ converter 31, the color adaptation conversion may be performed at the sending end. In this case, the white point data of the monitor B provided at the receiving end and the data of the output image illumination light source are transmitted from the receiving end to the sending end.

In the case where the sending part includes not only the RGB-to-XYZ converter 31 but also the color adaptation converter 32 and the XYZ-to-RGB converter 33, all processes may be performed at the sending end and the resultant data may be transmitted to the receiving end. In this case, the data of the output image illumination light source, the white point data of the monitor B, and the profile data of the monitor B are transmitted from the receiving end to the sending end.

Conversely when all processes are performed at the receiving end 110, the sending part 100 may transmit information about the input device including the profile data of the monitor A and the data of the input image illumination light source together with the image data to the receiving end.

OTHER EMBODIMENTS

In the embodiments described above, the light source at the sending end is employed as the input image illumination light source. Instead, the data of a desired virtual light source may be manually input through an input device (not shown) at the receiving end, so as to obtain an image having colors under a particular light source.

Furthermore, the invention also includes within its scope a system in which a software program is supplied to a computer (CPU or MPU) so that various devices are controlled by the computer in such a manner as to achieve the various functions required in the system.

In this case, the software program code itself is used to achieve the functions which are realized by means of hardware in the above-described embodiments, and thus the program code and the means for supplying the program code to the computer such as a recording medium on which the program code is stored fall within the scope of the invention.

Specific examples of such a recording medium for storing the program code include a floppy disk, a hard disk, an optical disk, a magneto-optic disk, a CD-ROM a magnetic tape, a nonvolatile memory card, and a ROM.

In the case where the functions of any embodiment described above are realized by executing the program code on the computer which operates under the control of an OS (operating system) or in the case where the functions of any embodiment described above are realized by executing the program code in cooperation with another application software, the program code also falls within the scope of the invention.

The invention also includes within its scope a program code and a system in which the program code is stored in a memory provided on an extended board of a computer or in an extended unit connected to the computer, and all or a part of the process is performed by a CPU located on the extended board or in the extended unit according to the program code.

In the present invention, as described above, input image illumination light source information and other information required to perform color adaptation conversion depending on the particular device and technique employed are transmitted together with image data from a sending end to a receiving end thereby ensuring that excellent matching in color is achieved between the sending and receiving ends regardless of the differences in the input and output devices and regardless of the differences in environmental conditions.

Furthermore, the system can be realized in a simple fashion by transmitting data required to perform color adaptation conversion depending on the image observation tool and the technique employed.

The present invention is not limited to the foregoing embodiments but is subject to various modifications within the scope and spirit of the appended claims.

What is claimed is:

1. An image processing apparatus for transmitting image data to a second image processing apparatus having a function of performing a color matching process by using a source device profile and a destination device profile, and a function of performing color adaptation conversion on a basis of output image illumination light source information, input image illumination light source information and reference white data included in the source device profile, said apparatus comprising:

an input unit, adapted for use in inputting input image illumination light source information and the source device profile, wherein the source device profile includes a color conversion condition and reference white data of the color conversion condition; and a transfer unit, adapted to transfer the input image illumination light source information, the source device profile, and image data depending on the source device to the second image processing apparatus through a communication line.

2. An image processing apparatus according to claim 1, further comprising a light source sensor for sensing an input image illumination light source thereby generating input image observing environment information.

3. An image processing apparatus according to 1, further comprising a light source setter, adapted for use in setting the desired image observing light source on basis of a manual instruction.

4. An image processing apparatus comprising:

an input unit, adapted for use in inputting input image data, profile data of a source device, and input image illumination light source information from an external apparatus through a communication line, wherein color processing information and reference white data of the color processing information are included in profile information;

a color adaptation converter, adapted to perform color adaptation conversion according to output image illumination light source information, the input image illumination light source information and the reference white data of the color processing information;

a color matching processor, adapted to perform a color matching process according to the color processing information and profile data of an output device; and an output unit, adapted to output, to the output device, image data which has been subjected to the color adaptation conversion and the color matching process.

5. An image processing apparatus according to claim 4, wherein said color adaptation converter converts the input image data, which depends on the standard light source described in the profile data of the source device, into a form adapted to the input image illumination light source and also adapted to the output image observing environment.

6. An image processing apparatus according to claim 4, further comprising a light source sensor for sensing the output image illumination light source thereby generating the output image observing environment information.

7. An image processing apparatus according to claim 4, wherein said color adaptation conversion process includes the step of performing color processing to correct a perceived color difference due to the mode difference between light source color and object color.

8. An image processing method of transmitting image data to an image processing apparatus having a function of performing a color matching process by using a source device profile and a destination device profile, and a function of performing color adaptation conversion on a basis of output image illumination light source information and input image illumination light source information and reference white data included in the source device profile, said method comprising the steps of:

inputting input image illumination light source information and the source device profile, wherein the source device profile includes a color conversion condition and reference white data of the color conversion condition; and transferring the input image illumination light source information, the source device profile, and image data depending on the source device to the image processing apparatus through a communication line.

9. An image processing method, comprising the steps of:

inputting input image data, profile data of a source device, and input image illumination light source information from an external apparatus through a communication line, wherein color processing information and reference white data of the color processing information are included in profile information;

performing color adaptation conversion according to output image illumination light source information, the input image illumination light source information and the reference white data of the color processing information;

performing a color matching process according to the color processing information and profile data of an output device; and outputting, to the output device, image data which has been subjected to the color adaptation conversion and the color matching process.

10. A computer readable medium having recorded thereon codes for implementing a computer implementable image processing method of transmitting image data to an image processing apparatus having a function of performing a color matching process by using a source device profile and a destination device profile, and a function of performing color adaptation conversion on a basis of output image illumination light source information and input image illumination light source information and reference white data included in the source device profile, said method comprising the steps of:

inputting input image illumination light source information and the source device profile, wherein the source device profile includes a color conversion condition and reference white data of the color conversion condition; and transferring the input image illumination light source information, the source device profile, and image data depending on the source device to the image processing apparatus through a communication line.

11. A computer readable medium having recorded thereon codes for implementing a computer implementable image processing method, comprising the steps of:

inputting input image data, profile data of a source device, and input image illumination light source information from an external apparatus through a communication line, wherein color processing information and reference white data of the color processing information are included in profile information;

performing color adaptation conversion according to output image illumination light source information, the input image illumination light source information and the reference white data of the color processing information;

performing a color matching process according to the color processing information and profile data of an output device; and outputting, to the output device, image data which has been subjected to the color adaptation conversion and the color matching process.

* * * * *